Patented Nov. 5, 1940

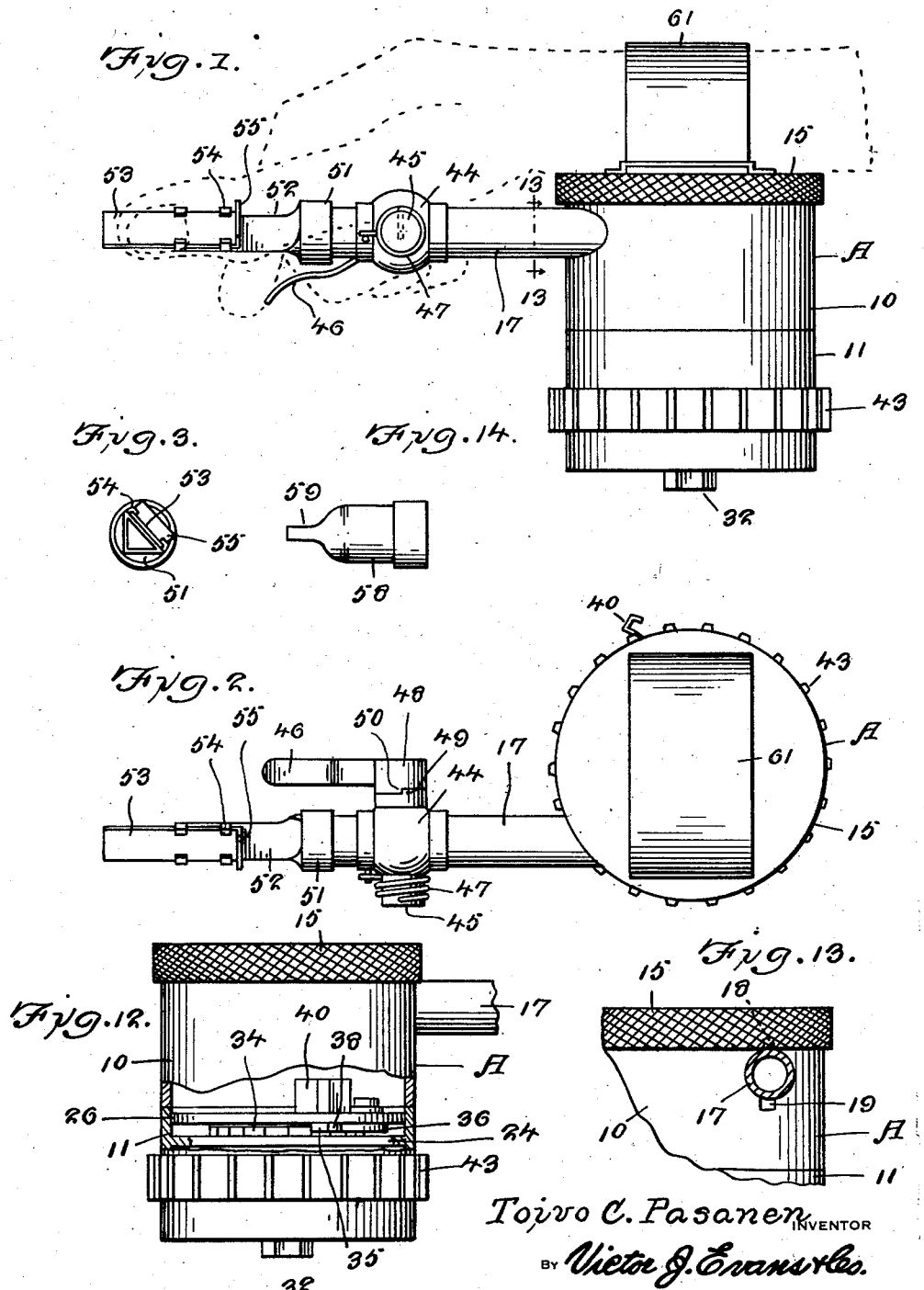

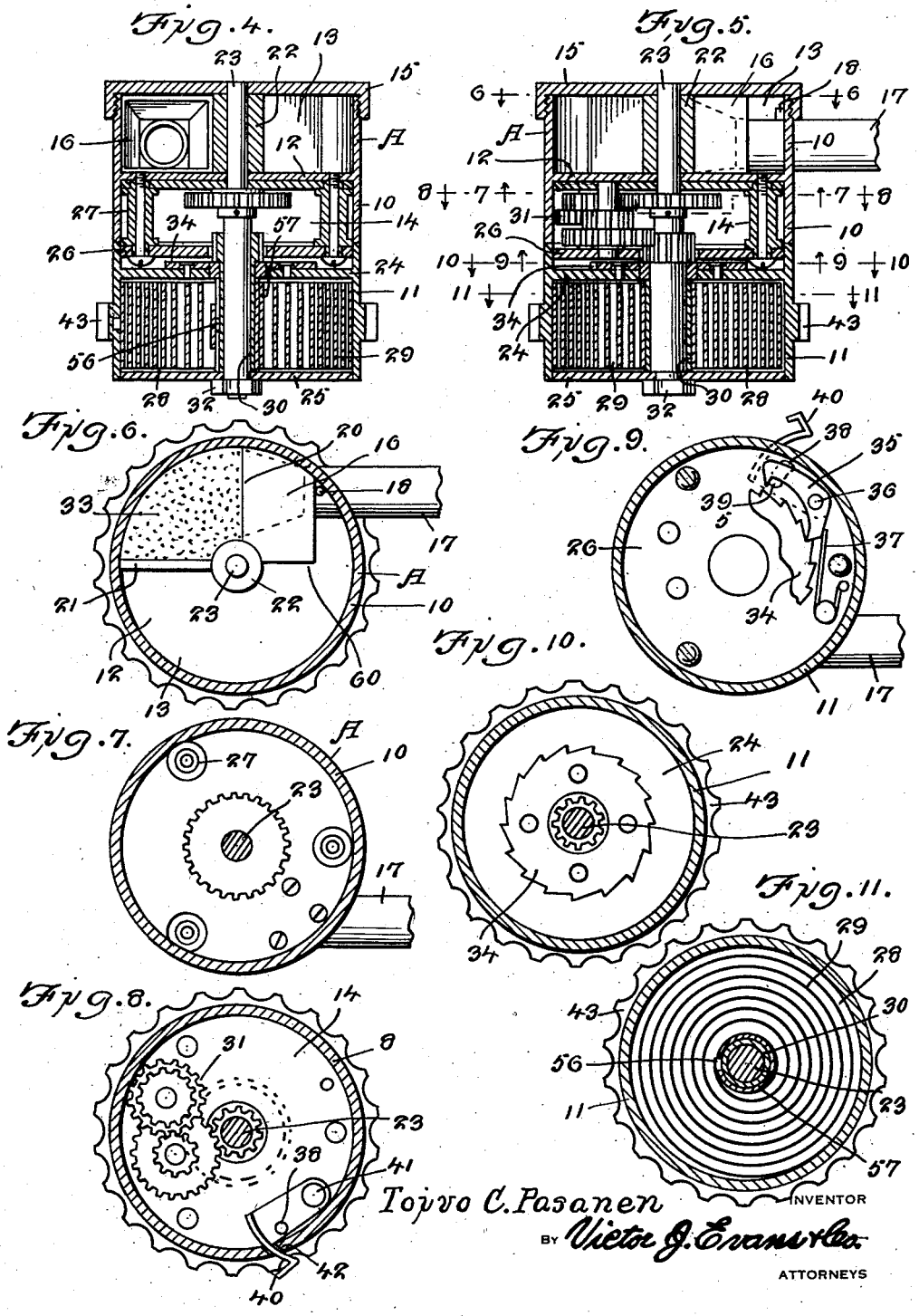

2,220,119

UNITED STATES PATENT OFFICE 2,220,119

PUTTYING TOOL

Toivo C. Pasanen, Franklin Mine, Mich.

Application February 15, 1939, Serial No. 256,578

6 Claims. (Cl. 18—3.5)

The invention relates to a puttying tool and more especially to a tool for applying plastics for caulking and puttying purposes.

The primary object of the invention is the provision of a tool of this character, wherein the discharge nozzle delivers the substance of material in ribbon or strip form and in a manner to avoid spreading of the substance or material resulting in neatness in the finished work and assuring against waste of the substance or material and economy in consumption thereof, the substance or material being subjected to pressure for the positive feed thereof and the discharge of the same from the tool.

Another object of the invention is the provision of a tool of this character, wherein the plastic substance is conveniently held and the control of the flow thereof had, being subjected to pressure from an impact wing spring operated and the discharge nozzle for the material substance has associated therewith, in one instance, a flexible putty knife blade so that the said material or substance can be neatly applied, particularly in the use thereof in a sash or door for puttying the panes or panels thereof in securing the same in place, the flow of the material or substance being regulated by a hand operated valve so that the supply of such material or substance can be cut off with dispatch and the applying of the discharged substance or material had with neatness and without waste.

A still further object of the invention is the provision of a tool of this character, wherein the blade associated with the discharge nozzle for the smoothing of the discharged material or substance is susceptible of adjustment and in this way allowing the application of such substance or material in close quarters without interference by the blade and such blade when in another adjusted position will smooth the discharged material and compress the same in place, the tool being readily carried upon the arm of an operator and thus avoiding hand carrying thereof, leaving the hands of such operator free for manipulation of the tool and its control.

A still further object of the invention is the provision of a tool of this character, wherein the same can be readily loaded with dispatch and the contents readily and conveniently discharged for caulking and puttying purposes and a single hand of an operator is required for the handling of such tool for the purposes stated.

A still further object of the invention is the provision of a tool of this character, which is completely simple in construction, thoroughly reliable and efficient in operation, compact, readily and easily handled, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a side elevation of the tool constructed in accordance with the invention showing the same in wearing position upon the arm of an operator.

Figure 2 is a top plan view of the tool.

Figure 3 is an outer end view of the discharge nozzle of the tool.

Figure 4 is a vertical sectional view through the body of the tool.

Figure 5 is a view similar to Figure 4 taken at an angle thereto.

Figure 6 is a sectional view taken on the line 6—6 of Figure 5 looking in the direction of the arrows.

Figure 7 is a sectional view taken on the line 7—7 of Figure 5 looking in the direction of the arrows.

Figure 8 is a sectional view taken on the line 8—8 of Figure 5 looking in the direction of the arrows.

Figure 9 is a sectional view taken on the line 9—9 of Figure 5 looking in the direction of the arrows.

Figure 10 is a sectional view taken on the line 10—10 of Figure 5 looking in the direction of the arrows.

Figure 11 is a sectional view taken on the line 11—11 of Figure 5 looking in the direction of the arrows.

Figure 12 is a fragmentary side elevation partly in section of the tool.

Figure 13 is a fragmentary sectional view taken on the line 13—13 of Figure 1 looking in the direction of the arrows.

Figure 14 is a side elevation of a modified form of discharge nozzle for the tool.

Similar reference characters indicate corresponding parts throughout the several views in the drawings.

Referring to the drawings in detail, the tool constituting the present invention comprises a sectional cylindrical body or housing A, its sections 10 and 11 being disposed in end to end matched relation to each other and within the section 10 is a dividing wall 12 separating said section into chambers or compartments 13 and 14, respectively, the former being accessible on removal of a top cover or cap 15, preferably removably threaded upon this section. The chamber or compartment 13 constitutes a plastic receiving and discharge well for putty or the like. The chamber or compartment 14 constitutes a gearing space for confinement of gearing hereinafter described.

Built within the chamber or compartment 13 is a discharge mouth 16 in which is removably socketed a delivery tube-like stem 17 which is provided with a locking pin or key 18 passable through a keyway 19 formed in the section 10 for the separable fastening of said stem in the body or housing A and socketed in the mouth 16. The mouth 16 is tapered in the direction of the stem 17 and at the larger open portion thereof communicates with the chamber or compartment 13, the edge 20 about this larger open area of the mouth being radially disposed with respect to the center of said chamber or compartment 13 and constitutes a seat for a compressor wing or blade 21 having a sleeve-like hub 22 fixed to a rotatable shaft 23 journaled centrally of the compartment or chamber 13 in the dividing wall 12 and cover or cap 15, respectively. The shaft 23 is carried through the chamber or compartment 14 and also centrally through a dividing wall 24 in the section 11 and a cover piece 25 for the outer open end of the said section 11 as well as through a bearing plate 26 next to and spaced from the dividing wall 24 of the said section 11. This bearing plate 26 is held fixed upon posts or spacer members 27 joined with the dividing wall 12 in the section 10. The dividing wall 24 and the cover piece 25 create within the section 11 a space 28 for a winding and unwinding coiled power spring 29, one end being suitably fixed to the section 11 and the other end fixed to a sleeve-like turning hub 30 loosely fitting about the shaft 23 carried through the said space 28. This hub 30 through a train of speed reducing gears 31 has driving connection with the shaft 23 for rotation thereof when the power spring 29 is wound and active for driving purposes, the winding being accomplished by the turning of the section 11.

The train of gears 31 connected between the shaft 23 and the hub 30 is confined within the chamber or compartment 14 in the section 10 and access had thereto by removal of the bearing plate 26 on separation of the sections 10 and 11. The cover plate 25 is made fast to the shaft 23 by a nut 32 separably threaded on the said shaft. The rotation of the shaft 23 turns the wing or blade 21 within the chamber or compartment 13 for forcing the plastic material 33 packed therein through the mouth 16 for discharge through the stem 17 in a manner presently described.

In filling the chamber or compartment 13, the wing or blade 21 is in a position remotely from the edge 20 about the larger opening area of the mouth 16 which constitutes a seat for the wing or blade 21 when the material 33 has been completely spent or discharged from within the chamber or compartment 13 in the use of the tool.

Fixed to the dividing wall 24 in the section 11 about the hub 30 loose upon the shaft 23 is a ratchet wheel 34 with which engages an escapement dog or pawl 35, being pivoted at 36 and spring tensioned at 37, while acting upon this pawl or dog 35 is a tripping lug 38 extended through a clearance slot 39 and projected from a finger operated actuating trigger 40, pivoted at 41 and extended through a way 42 to without the section 10 of the body or housing A for manual control thereof. The pawl or dog 35 functions for locking the spring 29 in a wound condition, the winding of the said spring being had by the turning of the section 11 and this pawl or dog 35, when actuated by the trigger 40, allows a step by step escapement action upon the spring 29 for the gradual or step by step unwinding thereof and in this manner the wing or blade 21 will be relieved of pressure so that it can be turned away from the mouth 16 to a remote place therefrom within the chamber or compartment 13 to allow for the filling thereof with the plastic material 33 and a maximum loading of such material within this chamber or compartment. Furthermore, this escapement varies the tensioning action of the spring 29 for the driving of the train of gears 31 and the compression activity of the wing or blade 21 upon the load or charge within the compartment or chamber 13 in the section 10 of the tool. The compression activity of the wing or blade 21 on the material 33 regulates the speed of discharge of such material from the tool and the control of this discharge being hereinafter set forth.

The section 11 exteriorly thereof is formed with a serrated, corrugated or fluted annular bead or gripping area 43 which enables the convenient turning of the section 11 for the winding of the spring 29 within the space 28. The hub 30 is latched by the pawl or dog 35 against turning movement when the spring 29 is being wound.

The keyway 19 in the section 10 provides a vent for the escape of air rearwardly of the compressor wing or blade 21 to assure against a possible vacuum within the chamber or space 13 in the operation of the device.

The discharge stem 17 is provided with a valve casing 44 for a cutoff turn plug valve 45 operated by a hand lever 46. This valve 45 is maintained in a cutoff position by a coiled spring 47 connected to its turning arbor and to the valve casing 44 exteriorly thereof. The casing 44 and the hub 48 of the lever 46 are provided with stop shoulders 49 and 50, respectively, so that the valve 45 will be held through these stop shoulders in a cutoff position, this being the normal position of said valve. The valve 45 controls the discharge of the plastic substance or material from within the compartment or chamber 13 in the section 10 of the casing or housing A when the device is operated.

Removably fitted on the outer end of the stem 17 outwardly of the valve 45 is a discharge nozzle 51, the major portion of which is of substantially triangular shape in cross section and constitutes the tip 52 of said nozzle. Slidably fitted exteriorly against one flat side of the tip 52 is an adjustable flexible putty knife blade 53, being held slidably fitted with the said tip by guide lugs 54 and is provided with a finger grip 55 for manual control thereof. The tip 52 of the nozzle 51 delivers the plastic substance or material from the device in substantially triangular ribbon or strip form and the putty knife blade 53 presses this strip form into place for the sealing of panes or panels within window sashes, doors or the like. When the tip 52 is brought into a restricted or contracted place where there is required the application of the plastic substance or material, the blade 53 is retracted sufficiently to allow the proper application of the plastic substance or material at such point or location and in this way the blade 53 will not interfere in the proper handling of the device.

The spring 29 is joined to the hub 30 preferably through the use of a fastener 56, which engages in a clip 57 about the hub 30 and in this fashion the end of the spring 29 is made secure thereto.

In Figure 14 of the drawings there is shown a slight modification of nozzle, which is indicated generally at 58, and is formed with a flattened discharge tip 59 which delivers the plastic substance or material through this nozzle 58 in a flat, ribbon-like form. In this instance of use of the nozzle 58, the putty knife blade 53 is dispensed with, being required that a separate putty knife be used for the application of the flat, ribbon-like substance to the work.

The mouth 16 within the chamber or compartment 13 forms a dividing partition between the wall of the section 10 and the hub 22 of the wing or blade 21 operating within this chamber or compartment and such wing or blade when receded with respect to the mouth 16 is adapted to abut the side 60 of said mouth and a maximum or full storage capacity is had within the chamber or compartment 13 for the filling thereof with plastic substance or material.

The cover or cap 15 has attached thereto a wrist strap 61 for fitting about the wrist of a user of the device so that the latter can be carried conveniently and in this manner relieving the hand carrying of such device, this being illustrated in Figure 1 of the drawings.

By the turning of the valve 45, the quantity of plastic substance or material to be discharged from the chamber or compartment 13 under compression can be readily controlled and the device in its structural make-up is susceptible of convenient handling and will eliminate waste of the material or substance as well as enabling a smooth, neat and clean application thereof to the work.

What is claimed is:

1. A tool of the character described comprising a receptacle having a socketed discharge mouth extending outwardly through one side of the same, a rotary impact wing within said receptacle for forcing material through said discharge mouth, a delivery stem separately fitting the socketed mouth, a locking pin carried by the stem and detachably engaged in the side of said receptacle for removably securing the stem in the socketed mouth, and a discharge nozzle separably fitted with said stem and having a tip formation for delivering material therethrough in ribbon-like fashion.

2. A tool of the character described comprising a receptacle having a socketed discharge mouth extending outwardly through one side of the same, a rotary impact wing within said receptacle for forcing material through said discharge mouth, a delivery stem separably fitting the socketed mouth, a locking pin carried by the stem and detachably engaged in the side of said receptacle for removably securing the stem in the socketed mouth, a discharge nozzle separably fitted with said stem and having a tip formation of delivering material therethrough in ribbon-like fashion, and a putty knife blade slidably fitting said discharge nozzle and having inherent flexibility.

3. A tool of the character described comprising a receptacle having a socketed discharge mouth extending outwardly through one side of the same, a rotary impact wing within said receptacle for forcing material through said discharge mouth, a delivery stem separably fitting the socketed mouth, a locking pin carried by the stem and detachably engaged in the side of said receptacle for removably securing the stem in the socketed mouth, a discharge nozzle separably fitted with said stem and having a tip formation for delivering material therethrough in ribbon-like fashion, a putty knife blade slidably fitting said discharge nozzle and having inherent flexibility, and a windable power spring in the receptacle and having driving connections with said wing.

4. A tool of the character described comprising a receptacle having a socketed discharge mouth extending outwardly through one side of the same, a rotary impact wing within said receptacle for forcing material through said discharge mouth, a delivery stem separably fitting the socketed mouth, a locking pin carried by the stem and detachably engaged in the side of said receptacle for removably securing the stem in the socketed mouth, a discharge nozzle separably fitted with said stem and having a tip formation for delivering material therethrough in ribbon-like fashion, a putty knife blade slidably fitting said discharge nozzle and having inherent flexibility, a windable power spring in the receptacle and having driving connections with said wing, and a trigger controlled escapement correlated wtih the said driving connections and said power spring.

5. A tool of the character described comprising a receptacle having a socketed discharge mouth extending outwardly through one side of the same, a rotary impact wing within said receptacle for forcing material through said discharge mouth, a delivery stem separably fitting the socketed mouth, a locking pin carried by the stem and detachably engaged in the side of said receptacle for removably securing the stem in the socketed mouth, a discharge nozzle separably fitted with said stem and having a tip formation for delivering material therethrough in ribbon-like fashion, a putty knife blade slidably fitting said discharge nozzle and having inherent flexibility, a windable power spring in the receptacle and having driving connections with said wing, a trigger controlled escapement correlated with the said driving connections and said power spring, and means for regulating the discharge of material through the said stem from within the receptacle.

6. A tool of the character described comprising a receptacle having a socketed discharge mouth extending outwardly through one side of the same, a rotary impact wing within said receptacle for forcing material through said discharge mouth, a delivery stem separably fitting the socketed mouth, a locking pin carried by the stem and detachably engaged in the side of said receptacle for removably securing the stem in the socketed mouth, a discharge nozzle separably fitted with said stem and having a tip formation for delivering material therethrough in ribbon-like fashion, a putty knife blade slidably fitting said discharge nozzle and having inherent flexibility, a windable power spring in the receptacle and having driving connections with said wing, a trigger controlled escapement correlated with the said driving connections and said power spring, means for regulating the discharge of material through the said stem from within the receptacle, and a turnable cap fitting said receptacle for winding the said spring.

TOIVO C. PASANEN.